(12) United States Patent
Fukushi et al.

(10) Patent No.: US 11,884,882 B2
(45) Date of Patent: Jan. 30, 2024

(54) ELECTROCHROMIC DEVICE

(71) Applicants: TOSHIBA MATERIALS CO., LTD., Yokohama (JP); HAYASHI TELEMPU CORPORATION, Nagoya (JP)

(72) Inventors: Daisuke Fukushi, Kanagawa (JP); Shuichi Saito, Kanagawa (JP); Michiaki Fukui, Nagoya (JP)

(73) Assignees: Toshiba Materials Co., Ltd., Yokohama (JP); Hayashi Telempu Corporation, Nagoya (JP)

(*) Notice: Subject to any disclaimer, the term of this patent is extended or adjusted under 35 U.S.C. 154(b) by 316 days.

(21) Appl. No.: 17/465,991

(22) Filed: Sep. 3, 2021

(65) Prior Publication Data

US 2022/0100045 A1 Mar. 31, 2022

(30) Foreign Application Priority Data

Sep. 28, 2020 (JP) .................. 2020-161668

(51) Int. Cl.
| | |
|---|---|
| G02F 1/153 | (2006.01) |
| G02F 1/155 | (2006.01) |
| G02F 1/1524 | (2019.01) |
| C09K 9/00 | (2006.01) |

(52) U.S. Cl.
CPC .......... *C09K 9/00* (2013.01); *C09K 2211/181* (2013.01); *C09K 2211/183* (2013.01); *G02F 1/1524* (2019.01); *G02F 2202/36* (2013.01)

(58) Field of Classification Search
CPC ...... G02F 1/155; G02F 1/1524; G02F 1/1533; G02F 2001/164
See application file for complete search history.

(56) References Cited

U.S. PATENT DOCUMENTS

| | | |
|---|---|---|
| 6,005,705 A | 12/1999 | Schmidt et al. |
| 10,283,776 B2 | 5/2019 | Sasaki et al. |
| 2016/0264430 A1* | 9/2016 | Buissette ............... C01G 41/00 |

FOREIGN PATENT DOCUMENTS

| | | | | |
|---|---|---|---|---|
| CN | 108504271 A | * | 9/2018 | ........... C09D 133/04 |
| CN | 108659812 A | * | 10/2018 | ............. B82Y 20/00 |
| EP | 3666846 A1 | * | 6/2020 | ............. B32B 17/10 |
| JP | H03-043716 A1 | | 2/1991 | |
| JP | H09-512112 A1 | | 12/1997 | |
| JP | WO2016/039157 A1 | | 3/2016 | |

* cited by examiner

*Primary Examiner* — Bijan Ahvazi
(74) *Attorney, Agent, or Firm* — BURR PATENT LAW, PLLC

(57) ABSTRACT

According to one embodiment, provided is an electrochromic device including an electrochromic layer, which contains a tungsten oxide material. The tungsten oxide material includes potassium-containing tungsten oxide particles having an average particle size of 100 nm or less. The potassium-containing tungsten oxide particles contain potassium within a range of 1 mol % to 50 mol %, and include a central section and a peripheral section adjacent to the central section. A periodicity of a crystal varies between the central section and the peripheral section.

18 Claims, 5 Drawing Sheets

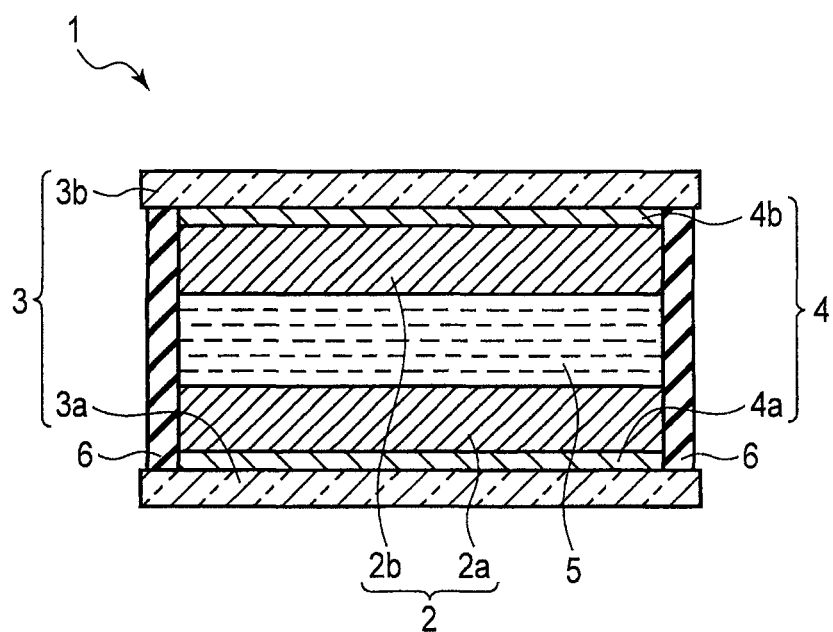
F I G. 1

ELECTROCHROMIC DEVICE

CROSS-REFERENCE TO RELATED APPLICATIONS

This application is based upon and claims the benefit of priority from Japanese Patent Application No. 2020-161668, filed Sep. 28, 2020, the entire contents of which are incorporated herein by reference.

FIELD

Embodiments described herein generally relate to electrochromic devices.

BACKGROUND

Electrochromic devices are devices which utilize a reversible change in photophysical properties upon applying electric charge to a substance. Electrochromic devices are used for displays or light-modulating systems, making use of the capability of altering photophysical properties. Examples of the light-modulating systems include light-modulating glass, light-modulating eyeglasses, and antidazzle mirror. The light-modulating systems are used in various fields such as vehicles, aircrafts, and buildings.

A tungsten oxide powder may be used as a material for the electrochromic devices. A reversible reaction occurring when an electric charge is applied to a material that exhibits electrochromism is an oxidation-reduction reaction that involves a transfer of electrons. Thus, as an approach to improve the rate of the reversible reaction, an attempt has been made to provide a hopping conduction characteristic to a material for the electrochromic devices.

Also, in order to improve the initial performance of the electrochromic devices, an attempt has been made to include an alkaline metal salt in a coating solution used to form an electrochromic layer that includes a tungsten oxide or a molybdenum oxide. Specifically, there is an aim to form an electrochromic device that fully exhibits its functions immediately after being produced, by adding alkaline metal ions to an electrochromic oxide layer in advance in its initial state.

In addition to the above, an attempt has been made to suppress degradation of the initial characteristics of the device that occurs when the coloring and discoloring are repeated, by using an electrochromic substance layer obtained by adding tungstate, such as lithium tungstate, sodium tungstate, and potassium tungstate, to a tungsten oxide as a chromogen of the electrochromic device. Namely, the objective of this approach is to obtain long-life electrochromic devices by improving the electrochromic substance.

BRIEF DESCRIPTION OF THE DRAWINGS

FIG. 1 is a cross-sectional view schematically showing an example of an electrochromic device according to an embodiment;

DETAILED DESCRIPTION

Figure 2:
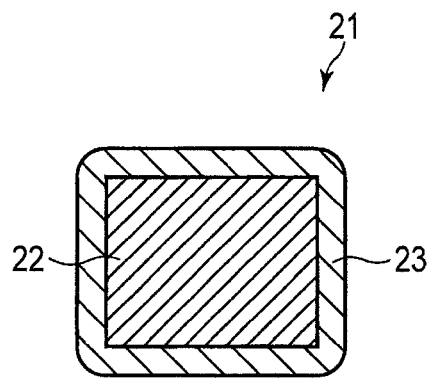
FIG. 2 is a cross-sectional view schematically showing an example of a potassium-containing tungsten oxide particle included in the electrochromic device according to the embodiment.

According to one embodiment, provided is an electrochromic device including an electrochromic layer, which contains a tungsten oxide material. The tungsten oxide material includes potassium-containing tungsten oxide particles having an average particle size of 100 nm or less. The potassium-containing tungsten oxide particles contain potassium within a range of 1 mol % to 50 mol %, and include a central section and a peripheral section adjacent to the central section. A periodicity of a crystal varies between the central section and the peripheral section.

The electrochromic device according to the embodiment includes the electrochromic layer that includes the tungsten oxide material including potassium-containing tungsten oxide particles with an average particle size of 100 nm or less. The potassium-containing tungsten oxide particles contain potassium within the range of 1 mol % to 50 mol %, and when the potassium-containing tungsten oxide particles are analyzed with a scanning transmission electron microscope (STEM), the periodicity of crystal varies between the central section and the peripheral section.

The above electrochromic device can exhibit a high response time for color switching. The electrochromic device can exhibit a higher response time than in the case of using a tungsten oxide powder provided with a hopping conduction characteristic by including a tungsten oxide material having the above configuration in the electrochromic layer.

FIG. 1 shows an example of the electrochromic device according to the embodiment. An electrochromic device 1 depicted includes a lower electrochromic layer 2a, an upper electrochromic layer 2b, a lower substrate 3a, an upper substrate 3b, a lower electrode 4a, an upper electrode 4b, an electrolyte layer 5, and seal members 6.

The electrochromic device 1 may be referred to as an EC device 1. The lower electrochromic layer 2a and the upper electrochromic layer 2b may be referred to as an electrochromic layer 2 or an EC layer 2. The lower substrate 3a and the upper substrate 3b may be collectively referred to as a substrate 3. The lower electrode 4a and the upper electrode 4b may be collectively referred to as an electrode 4. FIG. 1 shows an example in which two EC layers 2 are included with the electrolyte layer 5 interposed therebetween; however, the electrochromic device is not limited to such a structure. The electrochromic device may include a single EC layer 2 or three or more EC layers. For example, when the electrochromic device includes a single EC layer 2, the electrochromic device is configured to include only one of the lower electrochromic layer 2a or the upper electrochromic layer 2b. When the electrochromic device includes three or more EC layers 2, the electrolyte layer 5 and the electrochromic layers are arranged alternately in the configuration.

In the EC device 1, the lower EC layer 2a and the upper EC layer 2b are provided with the electrolyte layer 5 interposed therebetween. The lower electrode 4a and the lower substrate 3a are arranged on the lower surface of the lower EC layer 2a in the mentioned order. The upper electrode 4b and the upper substrate 3b are arranged on the upper EC layer 2b in the mentioned order. For the sake of convenience, the substrate 3 on the lower side will be referred to as the lower substrate 3a, and the electrode 4 on the lower side will be referred to as the lower electrode 4a. Likewise, the substrate 3 on the upper side will be referred to as the upper substrate 3b, and the electrode 4 on the upper side will be referred to as the upper electrode 4b. The ends of each EC layer 2 and the ends of the electrolyte layer 5 between the EC layers 2 are sealed by the seal members 6. Namely, in the EC device 1, the lower substrate 3a, the lower electrode 4a, the lower EC layer 2a, the electrolyte layer 5, the upper EC layer 2b, the upper electrode 4b, and the upper substrate 3b are arranged in the mentioned order from the lower side, and the seal members 6 are arranged on the lateral surfaces thereof.

The substrate 3 and the electrode 4 are transparent or colored. The substrate 3 may be a glass substrate or a resin substrate. The electrode 4 may be, for example, a transparent electrode or a metal electrode. Examples of the transparent electrode include tin-doped indium oxide (ITO), zinc oxide, gallium-doped zinc oxide (GZO), aluminum-doped zinc oxide (AZO), tin oxide, antimony-doped tin oxide (ATO), fluorine-doped tin oxide (FTO), and niobium-doped titanium oxide (TNO). Examples of the metal electrode include gold (Au), silver (Ag), platinum (Pt), and titanium (Ti).

The electrolyte layer 5 includes an electrolyte. For example, a liquid containing an electrolyte or a thin film formed of a polymer electrolyte may be used as the electrolyte layer 5. The liquid containing an electrolyte includes, for example, an electrolyte solution containing a salt of an electrolyte and a liquid solvent, or an electrolyte in liquid form. Specific examples of the electrolyte include salts obtained by combining anion species, such as bis (fluorosulfonyl) imide anion, bis (trifluoromethylsulfonyl) imide anion, perchlorate anion, and tetrafluoroborate anion, with cation species, such as alkaline metal ions (e.g., $K^+$, $Na^+$, $Li^+$, etc.) and $H^+$. Specific examples of the solvent include: carbonate solvents such as ethylene carbonate, propylene carbonate, dimethyl carbonate, and methyl ethyl carbonate; as well as, ionic liquids made of combinations of bulky asymmetric cations, such as imidazolium, pyrrolidinium, pyridinium, ammonium, or phosphonium, and anions including halide ions ($Cl^-$, $Br^-$, $I^-$), acetate ions, tetrafluoroborate ions, hexafluorophosphate ions, tetrachloro aluminate ions, bis (trifluoromethylsulfonyl) imide, ethylsulfate ions, dicyanamide ions and thiocyanate ions. Examples of the polymer electrolyte include: those cases where ether resins such as polyethylene oxide and polypropylene oxide, polyvinyl acetal resins such as polyvinyl butyral, polyvinyl acetate resins, polyvinyl alcohol resins, ethylene-vinyl alcohol copolymers, etc. are used in place of or as an additive to the above solvent; polymer electrolytes obtained by increasing viscosity of the above solvent by adding acrylic resins such as polymethylmethacrylate, polycarbonate resins, polyester resins such as polyethylene terephthalate, and cellulose resins such as cellophane; whilst others include polymer electrolytes obtained by adding, to an electrolyte, a resin that increases its viscosity or solidifies by cross-linking through heat or light.

The seal member 6 has a role of preventing the EC layer 2 and the electrolyte layer 5 from leaking, and preventing the EC layer 2 and the electrolyte layer 5 from degrading by being exposed to the external air. A material that hardly reacts with the EC layer 2 is preferably used for the seal member 6. Inorganic materials such as fritted glass, organic materials such as epoxy resins, metal, and the like may be used for the seal member 6.

In the discolored state, light entering from the upper substrate 3b can be transmitted to the lower substrate 3a. The light transmissibility can be changed by applying an electric charge to the EC layer 2. Namely, a colorless member can be turned into a colored state. When the EC layer 2 is in a colored state, the EC device 1 does not allow light to pass through. With this function, the EC device 1 can be used as a light-modulating function or a display device.

Either the lower EC layer 2a or the upper EC layer 2b, or both the lower EC layer 2a and the upper EC layer 2b contain potassium-containing tungsten oxide particles.

Figure 3:
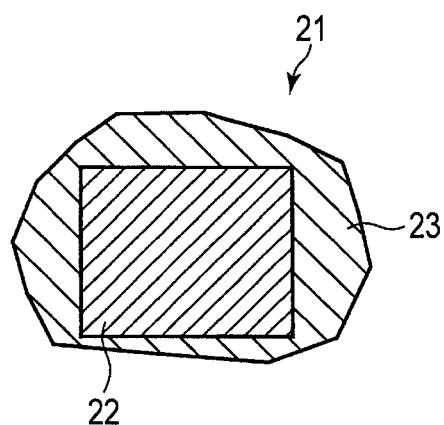
FIG. 3 is a cross-sectional view schematically showing another example of a potassium-containing tungsten oxide particle included in the electrochromic device according to the embodiment.

FIGS. 2 and 3 show examples of a potassium-containing tungsten oxide particle. Since the potassium-containing tungsten oxide particles are particles of tungsten oxide ($WO_3$) that contain potassium (K) within each particle, a potassium-containing tungsten oxide may be indicated as $K$—$WO_3$. FIGS. 2 and 3 each schematically show a cross section of a single $K$—$WO_3$ particle included in the tungsten oxide material. The depicted potassium-containing tungsten oxide particles 21 each include a central section 22 and a peripheral section 23 with varying periodicity of the tungsten oxide crystal. The peripheral section 23 is adjacent to the central section 22. FIG. 2 shows an example in which the width of the peripheral section 23 when viewed in cross section is uniform over the entire periphery of the cross section. FIG. 3 shows an example in which the width of the peripheral section 23 varies depending on the position. The width of the peripheral section 23 may be uniform or non-uniform. Namely, the peripheral section 23 may be present as a layer having a uniform thickness on the central section 22 as core, or present as a layer having a non-uniform thickness on the central section 22 as core. In the examples shown in the figures, the central section 22 has a rectangular cross-section; however, the shape of the central section 22 is not limited to the examples shown in the figures. The central section 22 may have, for example, a square or trapezoidal cross-sectional shape and a cross-sectional shape similar thereto.

Both FIGS. 2 and 3 show an example in which the peripheral section 23 covers the entire periphery of the central section 22. The peripheral section 23 is preferably present on 80% to 100% of the outer periphery of the central section 22.

An average particle size of the $K$—$WO_3$ particles is 100 nm or less. Herein, the average particle size refers to an average particle size of primary particles of the $K$—$WO_3$ particles included in the $K$—$WO_3$ material, that is, an average primary particle size. The average particle size is obtained as follows. A sample including the tungsten oxide material is observed using a field emission scanning electron microscope (FE-SEM) to obtain a magnified image. Herein, the sample including the $K$—$WO_3$ material refers to a tungsten oxide powder containing the $K$—$WO_3$ particles, or an electrochromic layer including the $K$—$WO_3$ material. The longest diagonal line of the $K$—$WO_3$ powder shown in the magnified image is determined as the particle size of that powder particle. An average of the particle sizes of 100 particles arbitrarily extracted is determined as the average particle size. The magnification of the magnified image obtained by the FE-SEM is set to 50,000 times or more.

If the average particle size of the K—WO$_3$ particles is more than 100 nm, a sufficient surface area cannot be obtained. Thus, the average particle size is preferably 100 nm or less. The lower limit of the average particle size is not particularly limited; however, the average particle size is preferably 5 nm or more. If a powder material having an average particle size of 5 nm or more is used, the productivity of the electrochromic device will be favorable. Thus, the average particle size is preferably 5 nm to 100 nm, and more preferably 10 nm to 50 nm.

The K—WO$_3$ particles contain potassium (K) within the range of 1 mol % to 50 mol %. Potassium may be present as metal potassium or a potassium compound. Examples of the potassium compound include oxides (including composite oxides). By containing potassium, a transfer of electrons into and out from the electrochromic layer can be facilitated.

Herein, the content of potassium in the K—WO$_3$ particles refers to an amount of potassium included in the K—WO$_3$ particles. Namely, it refers to a total amount of potassium included in the central section and potassium included in the peripheral section. When the content of potassium in the K—WO$_3$ particles is 1 mol % or more, the above-mentioned effects obtained by containing potassium is fully exhibited. Also, when the potassium content is 50 mol % or less, favorable cost-effectiveness can be achieved. This is because even if potassium is contained in an amount exceeding 50 mol %, effects beyond those obtained when the potassium content is 50 mol % cannot be obtained. Thus, the content of potassium included in the K—WO$_3$ particles is preferably in the range of 1 mol % to 50 mol %, and more preferably in the range of 5 mol % to 35 mol %.

In the tungsten oxide material, potassium is not mixed with the WO$_3$ powder simply as independent particles of metal potassium or a potassium compound, but contained in the respective WO$_3$ particles included in the tungsten oxide material. Thus, in the electrochromic device which uses K—WO$_3$ particles, a distribution of the potassium in the electrochromic layer will not be variable.

The content of potassium in the K—WO$_3$ particles is determined according to the inductively coupled plasma (ICP) emission spectrometric analysis method. The ICP emission spectrometric analysis is a method of measuring the wavelength of the light generated by applying energy to the sample and vaporizing the sample into an atomic state. Since light corresponding to the atoms of the sample is emitted, an analysis at the scale of elements can be made. Also, since the measurement target is vaporized, the content of the entire sample can be measured. If the measurement is difficult to perform in the form of the EC layer as is, the K—WO$_3$ powder may be extracted from the EC layer to perform the measurement. For example, if the EC layer is a mixture of K—WO$_3$ particles and an organic substance, the organic substance may be removed so that the K—WO$_3$ particles are extracted as a powder sample.

In the ICP emission spectroscopy, first, the sample is dissolved with an acid and alkali to form a liquid, and introduced into argon plasma. The concentrations of K (potassium) and W (tungsten) are measured by measuring the light emitted through excitation of the sample with a detector. The concentration of K measured is converted into an amount of potassium atoms alone, and the concentration of W is converted into an amount of WO$_3$ molecules. The content of potassium is determined using these values obtained by converting the concentrations of K and W into the amount of solitary potassium and the amount of WO$_3$, and treating the particles in the sample containing tungsten oxide as K—WO$_3$ particles formed of K and WO$_3$.

Also, when the content of potassium is measured by performing an X-ray photoelectron spectroscopy (XPS) analysis on the sample of the K—WO$_3$ particles, the ratio $K_{XPS}/K_{ICP}$ of the content $K_{XPS}$ of potassium obtained according to the XPS method to the content $K_{ICP}$ of potassium obtained according to the above ICP emission spectrometric analysis method is preferably 1.05 or more.

The XPS analysis is a method in which a sample is irradiated with soft X-rays and photoelectrons released upon ionization of the sample are measured. The XPS analysis is an analysis method effective for measuring an element present in a neighborhood of a few nm depth from the sample surface. As described above, the ICP analysis is a method effective for quantifying the abundance in the entire sample. In contrast, the XPS analysis is a method effective for quantifying the abundance in the vicinity of the sample surface.

The ratio $K_{XPS}/K_{ICP}$ of the amount of potassium obtained according to the XPS analysis and the amount of potassium obtained according to the ICP analysis being 1.05 or more indicates that the abundance of potassium is greater in vicinity of the surface of the K—WO$_3$ particles. In other words, the ratio $K_{XPS}/K_{ICP}$ of the amounts of potassium according to these analysis methods being less than 1.05 indicates that the amount of potassium present at the particle surface is little. This indicates that there is little potassium in the peripheral section. Controlling the abundance of potassium is effective for controlling the aforementioned interatomic distance.

The upper limit of the ratio $K_{XPS}/K_{ICP}$ of the potassium content is preferably 5 or less. By limiting the ratio to 5 or less, the ratio of the interatomic distance between the central section and the peripheral section can easily fall within a predetermined range.

The measurement conditions of the XPS analysis are as follows: single crystalline spectroscopic Al K-α ray as an X-ray source; an X-ray output being 50.0 W; an analysis region of φ200 μm; and an angle between the sample surface and the detector being 45°.

When the K—WO$_3$ particles are subjected to a scanning transmission electron microscopy (STEM) analysis, the periodicity of the WO$_3$ crystal would vary between the central section and the peripheral section. An HAADF-STEM image is used for the STEM analysis. The HAADF-STEM refers to high angle annular dark field-scanning transmission electron microscopy. Hereinafter, the HAADF-STEM image may be simply referred to as a STEM image. In performing a STEM measurement, a thin film sample of the tungsten oxide powder is produced with a microtome using a dispersion method. Also, the measurement is performed at a magnification of 10,000,000 with the accelerating voltage of the STEM set to 200 kV.

Figure 4:
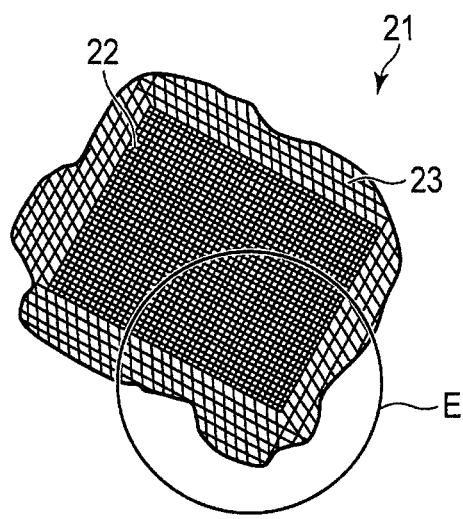
FIG. 4 is a cross-sectional view schematically showing the periodicity of the crystal in a potassium-containing tungsten oxide particle included in the electrochromic device according to the embodiment.
Figure 5:
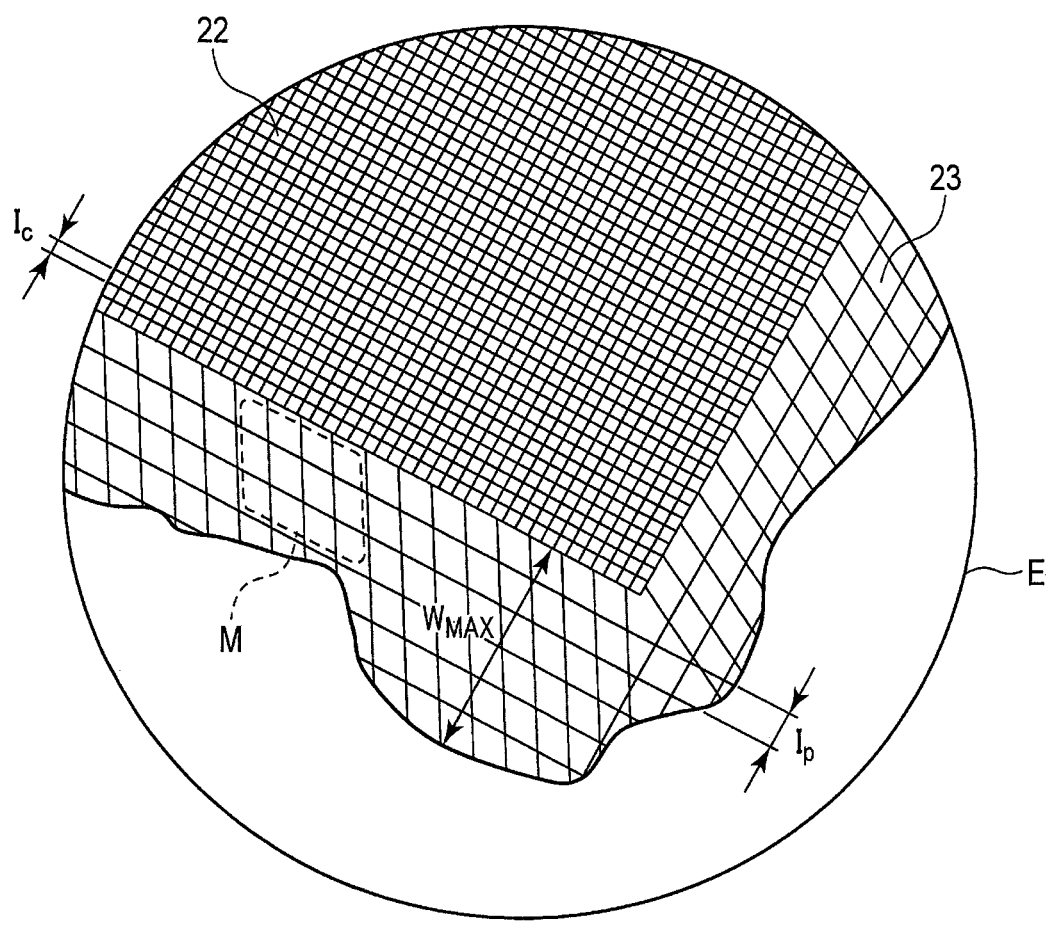
FIG. 5 is an enlarged cross-sectional view of section E shown in FIG. 4.

The periodicity of the crystal varying between the central section and the peripheral section indicates that there are regions with varying interatomic distance within the K—WO$_3$ particles. FIGS. 4 and 5 show a schematic cross-sectional view illustrating the concept of the varying periodicity of the crystal. FIG. 5 is an enlarged cross-sectional view of section E shown in FIG. 4. As shown in the figure, the K—WO$_3$ particle 21 has a crystal structure in which plural phases, which intersect with a direction from inside the particle toward the surface of the particle and are parallel to each other, are sequentially arranged in a direction toward the particle surface. In the K—WO$_3$ particle 21, an interatomic distance $I_c$ between adjacent phases among the plural phases in the central section 22 and an interatomic distance $I_p$ between adjacent phases among the plural phases in the peripheral section 23 differ from each other. When an amount of potassium in the peripheral section 23 is great, the interatomic distance $I_p$ in the peripheral section 23 is larger than the interatomic distance $I_c$ in the central section 22. When the periodicity of the crystal is the same within the whole particle, the interatomic distance is constant. Herein, the interatomic distance being constant indicates that the variation in the interatomic distance is 0.2 Å (angstrom) or less in the magnified image obtained by the STEM. The variation in the interatomic distance refers to a deviation from an average value of five discretionarily selected interatomic distances.

Figure 6:
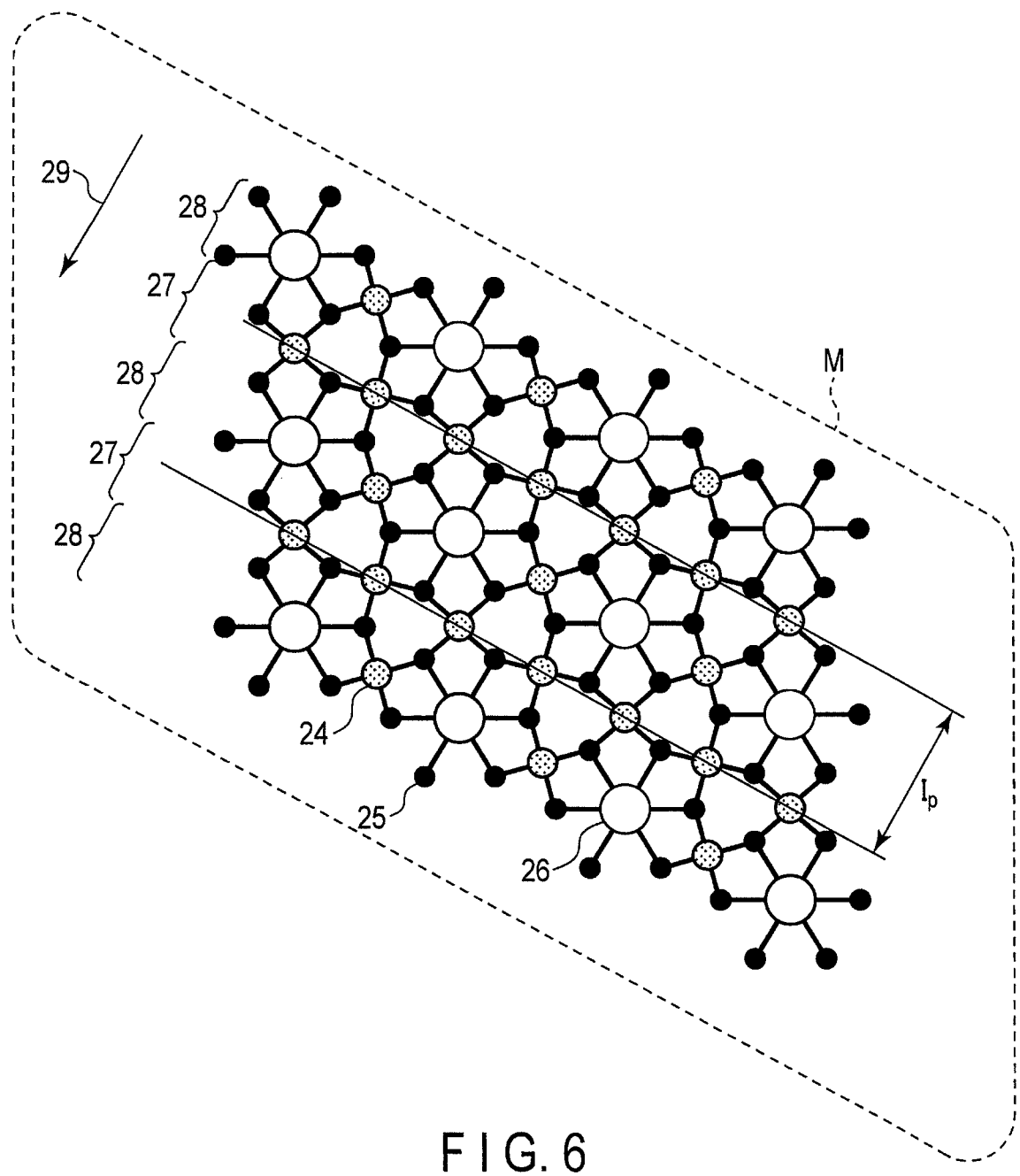
FIG. 6 is a magnified view schematically showing the molecular structure of section M shown in FIG. 5.

Each of the plural phases may be a phase having a layered structure. Herein, the interatomic distance is obtained based on the crystal structure in which these phases are arranged in parallel. A detailed description will be given with reference to FIG. 6. FIG. 6 is a magnified view of the section M shown in FIG. 5, and schematically shows the molecular structure of this section. FIG. 6 schematically shows the molecular structure of the potassium-containing tungsten oxide particle 21 within the peripheral section 23.

Each of the parallel phases that are sequentially arranged along the direction 29 from the center to the surface of the K—WO$_3$ particle 21 may include, for example, first crystal phases 27, in which tungsten atoms 24 and oxygen atoms 25 are aligned to form a layered structure, and second crystal phases 28, in which potassium atoms 26, tungsten atoms 24, and oxygen atoms 25 are aligned to form a layered structure. Both the first crystal phases 27 and the second crystal phases 28 may intersect with the direction 29 toward the particle surface. In addition, the first crystal phases 27 and the second crystal phases 28 may be arranged alternately along the direction 29 toward the surface. The interatomic distance indicates an interval between the first crystal phases 27, in which the tungsten atoms 24 and the oxygen atoms 25 are aligned. For example, the second crystal phases 28, with the potassium atoms 26, tungsten atoms 24, and oxygen atoms 25 aligned, are not taken into consideration. Specifically, a STEM analysis is performed considering the interval at which the layers of the tungsten atoms 24 and the oxygen atoms 25 are sequentially arranged in parallel in the direction 29 from the center toward the surface of the particle, as the interatomic distance. Namely, the periodicity of the crystal herein can be said to refer to the periodicity of the first crystal phase corresponding to the crystal of WO$_3$ not containing potassium. The direction 29 from the inside toward the surface of the particle may intersect with the interface between the central section 22 and the peripheral section 23.

While FIG. 6 represents the molecular structure of the peripheral section 23 of the K—WO$_3$ particle 21, in the same manner as in the case of the interatomic distance $I_p$ corresponding to the space between the first crystal phases 27 of uninterruptedly lined up tungsten atoms 24 and oxygen atoms 25, which are arranged in the direction 29 toward the surface in the peripheral section 23, the interatomic distance $I_c$ is also obtained for the central section 22 according to the STEM analysis. Namely, the interval between the crystal phases of uninterruptedly lined up tungsten atoms and oxygen atoms that are parallel to each other is determined as the interatomic distance $I_c$.

With the periodicity of the crystal varying between the central section and the peripheral section, the rate of the transfer of electrons into and out from the K—WO$_3$ particles can be facilitated. Thus, in the electrochromic device having the EC layer containing the tungsten oxide material, the response time for color switching can be improved.

The abundance of potassium is preferably greater in the peripheral section than in the central section. With the amount of potassium present in the peripheral section being great, the interatomic distance of the crystal in the peripheral section can be made large. Thus, in the EC device which adopts the tungsten oxide material containing K—WO$_3$ particles, the response time for color switching can be improved. The K—WO$_3$ particles may include particles which do not contain potassium in the central section but contain potassium only in the peripheral section.

The abundance proportion of potassium can be measured according to energy dispersive X-ray spectrometry (EDX). Through the EDX analysis, color-mapping of potassium contained in the tungsten oxide powder is performed. As the measurement conditions, the accelerating voltage is set to 15.0 kV, an area analysis is performed at a magnification of 1,000 or more, and the potassium abundance is determined from a ratio of the number of atoms between K (potassium) and W (tungsten) obtained according to the ZAF method.

The ZAF method is a correction method combining three corrections, which are atomic-number correction (Z), absorption correction (A), and fluorescence correction (F). The atomic-number correction (Z) is for correcting the ratio at which electrons applied to the sample are split into intruding electrons and scattered electrons. The absorption correction (A) is for correcting the amount of characteristic X-rays generated in the sample that are absorbed before exiting outside the sample. The fluorescence (excitation) correction (F) is for correcting the fluorescent X-ray intensity excited by the X-rays generated in the sample. The ZAF method is a common method as a correction method for EDX.

The peripheral section preferably has a maximum width of 1.5 nm to 5 nm. If the maximum width of the peripheral section is 1.5 nm or more, the proportion of presence of the peripheral section 23 is sufficient, whereby the above-mentioned effects are achieved. If the maximum width of the peripheral section is 5 nm or less, the proportion of presence of the peripheral section 23 may be appropriate. The maximum width of the peripheral section, in which the interatomic distance $I_p$ is in the range of 3.5 Å to 8.0 Å, is preferably 1.5 nm to 5 nm.

The width of the peripheral section almost coincides with the region having a large amount of potassium. As described above, the interatomic distance $I_p$ is large in the peripheral section, since potassium is present in great amount. A color change in the electrochromic device is a reversible reaction by input and output of electrons. With the peripheral section present at a predetermined proportion, inputting and outputting electrons can be easily performed in the peripheral section. Namely, the rate of the reversible reaction can be increased by performing input and output of electrons at the surface of the K—WO$_3$ particles. The region where the width of the peripheral section is not maximum may be thinner than this. The maximum width of the peripheral section is more preferably in the range of 2 nm to 4 nm.

The maximum width of the peripheral section can be determined as follows. First, an interface between the central section and the peripheral section of the K—WO$_3$ particles is ascertained in the STEM image showing the cross section of the K—WO$_3$ particles. The interface is determined as an outer periphery of the central section, and lines perpendicular to tangential lines for this outer periphery are drawn from the outer periphery of the central section to the particle surface. The lengths of the lines drawn from the central section straight toward the outer side in this manner are determined as the widths of the peripheral section at those positions, and the longest width among these widths is determined as the maximum width of the peripheral section. For example, in the exemplar K—WO$_3$ particle 21 shown in FIGS. 4 and 5, the width $W_{MAX}$ shown in FIG. 5 corresponds to the maximum width of the peripheral section 23.

The proportion of the peripheral section present on the outer periphery of the central section can be determined according to the STEM analysis. In the STEM image showing the cross-section of the K—WO$_3$ particles, the interface between the central section and the peripheral section is determined as the outer periphery of the central section in the portion(s) where the central section and the peripheral section are adjacent to each other, and the particle surface is determined as the outer periphery of the central section in the portion(s) where there is no peripheral section adjacent on the outer side of the central section. Among the combined entire outer periphery of the central section, the proportion of the portion (s) where the adjacent peripheral section is present is ascertained.

Since the potassium-containing tungsten oxide particles described above is provided with the peripheral section, the input and output of electrons can be performed mainly in the peripheral section. Thus, the rate of the transfer of electrons is improved. Accordingly, the electrochromic device including the electrochromic layer containing the potassium-containing tungsten oxide particles as a tungsten oxide material can exhibit a high rate of reversible reaction.

The electrochromic layer may further contain an organic substance in addition to the tungsten oxide material including the K—WO$_3$ particles. The content of the K—WO$_3$ particles in the EC layer is preferably 90% or more in terms of the area ratio. The electrochromic device which includes the K—WO$_3$ particles in the EC layer in an amount corresponding to 90% or more in terms of the area ratio has a sufficiently great proportion of presence of the K—WO$_3$ particles and can exhibit the above-mentioned color switching performance with improved response time. In addition, the content of the K—WO$_3$ particles in the EC layer is preferably 99.5% or less in terms of the area ratio. By limiting the content of the K—WO$_3$ particles to an amount corresponding to an area ratio of 99.5% or less, a sufficient amount of organic material can be contained, making it possible to suppress formation of pores in the EC layer and secure binding between the K—WO$_3$ particles or adhesion of the EC layer to the transparent electrode substrate. Therefore, degradation in performance due to such defects of the EC layer can be reduced.

In addition, the electrochromic layer may include voids between the K—WO$_3$ particles. A maximum size of the voids in the EC layer is preferably 0.5 μm or less (including 0 μm). The area ratio occupied by the voids within the EC layer is preferably 5% or less (including 0%). Also, the distance between adjacent K—WO$_3$ particles is preferably smaller than the average particle size of the K—WO$_3$ particles. Namely, it is preferable that the K—WO$_3$ particles be densely packed in the EC layer.

The thickness of the EC layer is preferably in the range of 0.3 μm to 2.0 μm. With a thickness of the EC layer being 0.3 μm or more, the EC layer can show a significant change in transmissivity between the transparent state and the colored state and exhibit practical electrochromism. With a thickness of the EC layer being 2.0 μm or less, peeling of the EC layer from the transparent electrode of the substrate can be suppressed. The thickness of the EC layer is more preferably in the range of 0.5 μm to 1.5 μm.

Figure 7:
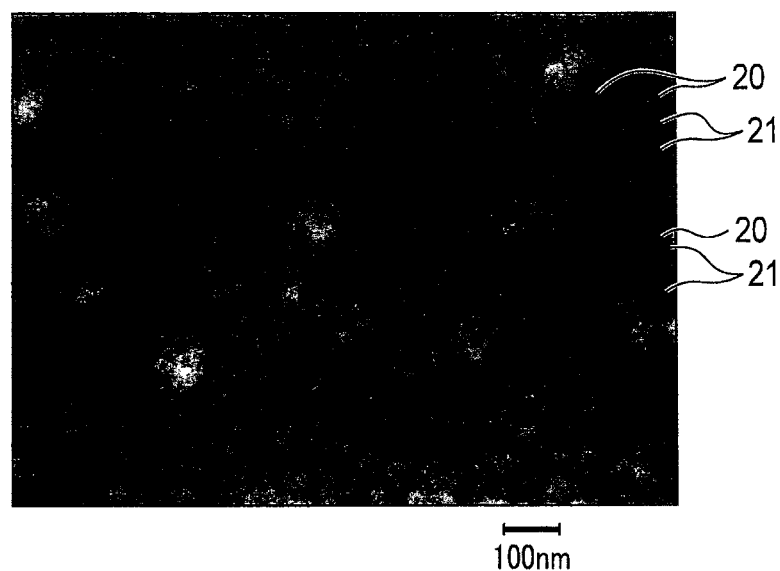
FIG. 7 is a scanning transmission electron micrograph showing an example of an electrochromic layer according to the embodiment.

The area ratio between the K—WO$_3$ particles and the voids in the EC layer is determined in a magnified image obtained by the scanning electron microscope (SEM). The SEM imaging is performed at a magnification of 10000 times or more. Also, for the SEM image, an image of a unit area of 0.5 μm×0.5 μm in a discretionary cross-section of the EC layer is captured. When the unit area cannot be measured in a single view, the measurement may be performed through multiple views. FIG. 7 shows a scanning electron microscope (SEM) image showing an example of the electrochromic layer. The SEM image shown in FIG. 7 was captured at a magnification of 100000 times. With the SEM image, the distance between the K—WO$_3$ particles 21 and the degree of the denseness of the voids 20 and the like can be observed. The average particle size of the K—WO$_3$ particles 12 included in the EC layer and the maximum size of the voids included in the EC layer can also be ascertained. The average particle size of the K—WO$_3$ particles 21 can be measured by a method according to the procedure for the powder sample described above. When the K—WO$_3$ particles and the voids in the EC layer can be observed three-dimensionally, the area ratio may be replaced by the volume ratio.

The potassium-containing tungsten oxide particles having the above configuration preferably accounts for 80% by mass to 100% by mass of the tungsten oxide material in the electrochromic layer. When the K—WO$_3$ particles having the peripheral section account for 80% by mass or more of the tungsten oxide in the EC layer, the above-mentioned improved response time for color switching can be achieved. Therefore, it is preferable to use a tungsten material containing 80% by mass or more of the above K—WO$_3$ particles, and it is more preferable to use a tungsten material containing 90% by mass or more of the above K—WO$_3$ particles. In other words, the powder material used in the electrochromic layer may contain 20% by mass or less of a tungsten oxide powder that does not have the peripheral section. Alternatively, the powder material used in the electrochromic layer may contain 20% by mass or less of a compound powder other than a tungsten oxide, such as a molybdenum oxide powder, that exhibits electrochromism.

By appropriately controlling the proportion of presence of the K—WO$_3$ particles having the peripheral section included in the EC layer of the EC device, the response time of the EC device can be accelerated. For example, a change from the colored state to the discolored state of the EC device can be accelerated.

The electrochromic device described above can be applied to, for example, displays or light-modulating systems. Examples of the light-modulating systems include light-modulating glass, light-modulating eyeglasses, and antidazzle mirror. Also, the light-modulating systems can be applied in various fields such as vehicles, aircrafts, and buildings.

Next, a method of producing the electrochromic device according to the embodiment will be described. For example, a slurry for producing an electrochromic device can be prepared using a tungsten oxide material containing K—WO$_3$ particles, to be used to produce an electrochromic device. By preparing a slurry of the tungsten oxide material, an electrode can be coated therewith to form an electrochromic layer. For example, it is difficult to form a film in a large area by the sputtering method. With the form of the slurry, a coating can be easily formed over a large area. The slurry is a mixture of a tungsten oxide powder containing K—WO$_3$ particles and a solvent. Examples of the solvent include water and alcohol. An organic substance may also be mixed in the slurry obtained by mixing a tungsten oxide powder and a solvent.

The above slurry is applied onto an electrode, and the resulting slurry coating is dried, as necessary, for the purpose of removing the solvent, for example, to thereby form the electrochromic layer. When producing the EC device 1 having the structure shown in FIG. 1, two sets of stacks, each obtained by forming the EC layer 2 on the electrode 4 by applying the slurry onto the electrode 4, are prepared. One of the two sets of stacks is a stack of the lower electrode 4a and the lower EC layer 2a, the other of the two sets of stacks is a stack of the upper electrode 4b and the upper EC layer 2b. The lower substrate 3a and the upper substrate 3b are arranged on a surface of the lower electrode 4a and a surface of the upper electrode 4b, respectively; the aforementioned stacks, the lower substrate 3a, the upper substrate 3b, and the sium contents obtained respectively according to the ICP analysis and the XPS analysis, the ratio $K_{XPS}/K_{ICP}$ therebetween, and the maximum width of the peripheral section are shown in Table 1. In regard to the "presence of the central section and the peripheral section with varying periodicity of the crystal", the case where there were regions with a varying interatomic distance is indicated as "present", and the case where there were no regions with a varying interatomic distance is indicated as "not present". In Comparative Example 1, no central section or peripheral section with varying periodicity of the crystal was ascertained, as shown in Table 1. Since Comparative Example 1 did not have the peripheral section, the width thereof was zero.

TABLE 1

|  | Average Particle Size (nm) | Presence of Central Section and Peripheral Section with Varying Periodicity | Potassium Content $K_{ICP}$ According to ICP Analysis (mol %) | Potassium Content $K_{XPS}$ According to XPS Analysis (mol %) | Potassium Content Ratio $K_{XPS}/K_{ICP}$ between XPS Analysis and ICP Analysis | Maximum Width of Peripheral Section (nm) |
|---|---|---|---|---|---|---|
| Example 1 | 12 | present | 5 | 5.5 | 1.1 | 1.8 |
| Example 2 | 16 | present | 8 | 12 | 1.5 | 2.2 |
| Example 3 | 18 | present | 9 | 15.3 | 1.7 | 2.6 |
| Example 4 | 22 | present | 15 | 31.5 | 2.1 | 3.1 |
| Example 5 | 25 | present | 30 | 90 | 3 | 4.6 |
| Comparative Example 1 | 8 | not present | 0 | 0 | 0 | 0 | electrolyte layer 5 are assembled so that the electrolyte layer 5 is positioned between the lower EC layer 2a and the upper EC layer 2b; and the lateral surface of the assembled structure is sealed by the seal members 6. Alternatively, the electrolyte layer 5 may be, for example, formed as a thin film on a surface of the lower EC layer 2a and/or the upper EC layer 2b using an electrolyte polymer.

The electrochromic device according to the embodiment includes, in the electrochromic layer, a tungsten oxide material including potassium-containing tungsten oxide particles having an average particle size of 100 nm or less and containing potassium in the range of 1 mol % to 50 mol %. When the potassium-containing tungsten oxide particles are analyzed with the STEM, the periodicity of the crystal varies between the peripheral section and the central section. The electrochromic device has an improved rate of electrochromic reversible reaction.

EXAMPLES

Examples 1 to 5 and Comparative Example 1

In Examples 1 to 5, a tungsten oxide precursor and a potassium precursor were mixed and reacted to produce a potassium-containing tungsten oxide powder. In Comparative Example 1, a tungsten oxide powder not containing potassium was prepared.

For the tungsten oxide powders obtained as described above in Examples 1 to 5 and Comparative Example 1, the average particle size of the particles included in the powders, the presence of the central section and the peripheral section with varying periodicity of the crystal, the potassium content (ICP analysis and XPS analysis), and the width of the peripheral section were examined by the method described above. The results are shown in Table 1 below. Specifically, the average particle size of the powder particles, the potas- Next, electrochromic layers were formed using the tungsten oxide powders of Examples 1 to 5 and Comparative Example 1. The electrochromic layers were formed by mixing the tungsten oxide powder with an organic substance and applying the resultant mixture to a glass substrate provided with an ITO film. Namely, a transparent glass substrate was used as a substrate, and ITO was used as a transparent electrode. The thicknesses of the respective electrochromic layers thus produced are shown in Table 2 below.

The area ratio of the K—$WO_3$ particles in the electrochromic layer, the area ratio of the voids, and the maximum void size were measured by the method using the SEM image described above. A measurement as to whether the distance between the adjacent K—$WO_3$ particles was smaller than the average particle size of the K—$WO_3$ particles was also performed using the SEM image. The results of the measurements are shown in Table 2. For the latter, the case where the distance between adjacent K—$WO_3$ particles was smaller than the average particle size of the K—$WO_3$ particles is indicated as "satisfied", and the case where the distance between adjacent K—$WO_3$ particles was not smaller than the average particle size of the K—$WO_3$ particles is indicated as "not satisfied". Note that in Table 2, although the label "Area Ratio of K—$WO_3$ Particles" is used also for Comparative Example 1, for sake of convenience, actually indicated is a numerical value of the area ratio of $WO_3$ particles not containing K. Likewise, in Comparative Example 1, the evaluation of "whether the distance between the adjacent K—$WO_3$ particles is smaller than the average particle size of the K—$WO_3$ particles" was performed on the $WO_3$ particles not containing K.

TABLE 2

| | Thickness (μm) | Area Ratio of K—WO₃ Particles (%) | Area Ratio of Voids (%) | Maximum Void Size (μm) | Distance Between Adjacent K—WO₃ Particles is Smaller than Average Particle Size of K—WO₃ Particles |
|---|---|---|---|---|---|
| Example 1 | 1 | 94 | <5 | <0.5 | satisfied |
| Example 2 | 1 | 95 | <5 | <0.5 | satisfied |
| Example 3 | 1 | 96 | <5 | <0.5 | satisfied |
| Example 4 | 1 | 95 | <5 | <0.5 | satisfied |
| Example 5 | 1 | 95 | <5 | <0.5 | satisfied |
| Comparative Example 1 | 1 | 95 | <5 | <0.5 | not satisfied |

Simple electrochromic devices were produced, as follows, using the electrochromic layers of Examples 1 to 5 and Comparative Example 1, and the response time of the respective electrochromic devices was measured. The electrochromic layers were cut into the same size while still being intact with the glass substrate provided with the ITO film, and immersed in an electrolyte solution in which potassium ion species was dissolved. Platinum as a counter electrode was put into the electrolyte solution, and a constant voltage was applied between the counter electrode and ITO, to thereby cause the WO₃ layer to undergo an electrochromic reaction. The time required to color the WO₃ layer and the time required to discolor the WO₃ layer were measured. When coloring, the time required for the absorbance at a wavelength of 600 nm to reach 1.0 or more was measured. When discoloring, the time required for the absorbance at a wavelength of 600 nm to reach 0.05 or less was measured. The results are shown in Table 3.

TABLE 3

| | Response Time (sec) | |
|---|---|---|
| | colored ⇒ discolored | discolored ⇒ colored |
| Example 1 | 47 | 63 |
| Example 2 | 43 | 61 |
| Example 3 | 36 | 62 |
| Example 4 | 36 | 63 |
| Example 5 | 49 | 66 |
| Comparative Example 1 | 60 | 70 |

As is apparent from Table 3, in the EC devices of Examples 1 to 5, the response time was improved and, in particular, the response time from the colored state to the discolored state was shortened considerably. This is assumed to be due to the presence of a predetermined amount of tungsten oxide powder containing potassium.

According to at least one embodiment and example described above, an electrochromic device is provided. The electrochromic device includes an electrochromic layer containing a tungsten oxide material. The tungsten oxide material includes potassium-containing tungsten oxide particles containing potassium within a range of 1 mol % to 50 mol %. The potassium-containing tungsten oxide particles have an average particle size of 100 nm or less. The potassium-containing tungsten oxide particles include a central section and a peripheral section adjacent thereto. A periodicity of crystal varies between the central section and the peripheral section. With the above electrochromic device, reversible color switching can be exhibited at a high response rate.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An electrochromic device comprising an electrochromic layer, the electrochromic layer containing a tungsten oxide material, the tungsten oxide material comprising potassium-containing tungsten oxide particles, the potassium-containing tungsten oxide particles having an average particle size of 100 nm or less, containing potassium within a range of 1 mol % to 50 mol %, and including a central section and a peripheral section adjacent to the central section, a periodicity of a crystal varying between the central section and the peripheral section,
wherein the potassium-containing tungsten oxide particles have a crystal structure in which plural phases intersecting with a direction from inside toward a surface of the particles and being parallel to each other are sequentially arranged in the direction, and wherein an interatomic distance $I_c$ between the plural phases adjacent to each other in the central section is different from an interatomic distance $I_p$ between the plural phases adjacent to each other in the peripheral section.

2. The electrochromic device according to claim 1, wherein an abundance of the potassium in the potassium-containing tungsten oxide particles is greater in the peripheral section than that in the central section.

3. The electrochromic device according to claim 2, wherein the peripheral section has a maximum width of 1.5 nm to 5 nm.

4. The electrochromic device according to claim 2, wherein a content of the potassium-containing tungsten oxide particles in the electrochromic layer is 90% to 99.5% in terms of an area ratio.

5. The electrochromic device according to claim 2, wherein the potassium-containing tungsten oxide particles account for 80% by mass to 100% by mass of the tungsten oxide material in the electrochromic layer.

6. The electrochromic device according to claim 2, wherein a distance between the potassium-containing tungsten oxide particles adjacent to each other in the electrochromic layer is smaller than the average particle size of the potassium-containing tungsten oxide particles.

7. The electrochromic device according to claim 1, wherein a ratio $K_{XPS}/K_{ICP}$ of a content $K_{XPS}$ of the potassium in the potassium-containing tungsten oxide particles according to X-ray photoelectron spectroscopy to a content $K_{ICP}$ of the potassium in the potassium-containing tungsten oxide particles according to an inductively coupled plasma emission spectrometric analysis method is 1.05 or more.

8. The electrochromic device according to claim 7, wherein the peripheral section has a maximum width of 1.5 nm to 5 nm.

9. The electrochromic device according to claim 7, wherein a content of the potassium-containing tungsten oxide particles in the electrochromic layer is 90% to 99.5% in terms of an area ratio.

10. The electrochromic device according to claim 7, wherein the potassium-containing tungsten oxide particles account for 80% by mass to 100% by mass of the tungsten oxide material in the electrochromic layer.

11. The electrochromic device according to claim 7, wherein a distance between the potassium-containing tungsten oxide particles adjacent to each other in the electrochromic layer is smaller than the average particle size of the potassium-containing tungsten oxide particles.

12. The electrochromic device according to claim 1, wherein the peripheral section has a maximum width of 1.5 nm to 5 nm.

13. The electrochromic device according to claim 12, wherein a content of the potassium-containing tungsten oxide particles in the electrochromic layer is 90% to 99.5% in terms of an area ratio.

14. The electrochromic device according to claim 12, wherein the potassium-containing tungsten oxide particles account for 80% by mass to 100% by mass of the tungsten oxide material in the electrochromic layer.

15. The electrochromic device according to claim 12, wherein a distance between the potassium-containing tungsten oxide particles adjacent to each other in the electrochromic layer is smaller than the average particle size of the potassium-containing tungsten oxide particles.

16. The electrochromic device according to claim 1, wherein a content of the potassium-containing tungsten oxide particles in the electrochromic layer is 90% to 99.5% in terms of an area ratio.

17. The electrochromic device according to claim 1, wherein the potassium-containing tungsten oxide particles account for 80% by mass to 100% by mass of the tungsten oxide material in the electrochromic layer.

18. The electrochromic device according to claim 1, wherein a distance between the potassium-containing tungsten oxide particles adjacent to each other in the electrochromic layer is smaller than the average particle size of the potassium-containing tungsten oxide particles.

* * * * *